US010735790B2

(12) United States Patent
Wheatley

(10) Patent No.: US 10,735,790 B2
(45) Date of Patent: *Aug. 4, 2020

(54) SYSTEMS AND METHODS FOR RECOMMENDING CONTENT

(71) Applicant: Rovi Guides, Inc., San Carlos, CA (US)

(72) Inventor: David John Wheatley, Tower Lakes, IL (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,412

(22) Filed: May 25, 2017

(65) Prior Publication Data

US 2017/0264931 A1 Sep. 14, 2017

Related U.S. Application Data

(63) Continuation of application No. 14/070,708, filed on Nov. 4, 2013, now Pat. No. 9,674,563.

(51) Int. Cl.
| | |
|---|---|
| *H04H 60/56* | (2008.01) |
| *H04N 21/25* | (2011.01) |
| *H04N 21/442* | (2011.01) |
| *H04N 21/422* | (2011.01) |
| *H04N 21/258* | (2011.01) |
| *H04N 21/482* | (2011.01) |
| *H04N 21/45* | (2011.01) |
| *H04N 21/4223* | (2011.01) |

(52) U.S. Cl.
CPC ..... *H04N 21/251* (2013.01); *H04N 21/25891* (2013.01); *H04N 21/4223* (2013.01); *H04N 21/42221* (2013.01); *H04N 21/44218* (2013.01); *H04N 21/4532* (2013.01); *H04N 21/4821* (2013.01); *H04N 21/4826* (2013.01)

(58) Field of Classification Search
CPC ........... H04N 21/251; H04N 21/25891; H04N 21/42221; H04N 21/4223; H04N 21/44218; H04N 21/4532; H04N 21/4821; H04N 21/4826
USPC .............................................. 725/12, 10, 46
See application file for complete search history.

(56) References Cited

U.S. PATENT DOCUMENTS

| | | | |
|---|---|---|---|
| 8,791,787 B2 * | 7/2014 | Hardacker | ............... H04N 5/66 340/5.1 |
| 9,241,114 B1 * | 1/2016 | McQuaide, Jr. | ....... H04N 5/268 |
| 2007/0229300 A1 | 10/2007 | Masato et al. | |
| 2007/0266403 A1 * | 11/2007 | Ou | ........................ G06Q 30/02 725/46 |
| 2008/0278635 A1 | 11/2008 | Hardacker et al. | |
| 2009/0133051 A1 | 5/2009 | Hildreth | |

(Continued)

Primary Examiner — Nnenna N Ekpo
(74) Attorney, Agent, or Firm — Haley Guiliano LLP

(57) ABSTRACT

Systems and methods for recommending content to a user are described. A user equipment device may be equipped with a built-in or separately connected image capturing device which may be used to pinpoint the location of the remote control when it is activated, thereby defining the specific location of the remote and the user. The relative location of the user in the room where the television is located may be associated with that particular user and used to automatically log in and access their user profile. This information may be used to enhance the television experience for the user by, e.g., recommending content.

16 Claims, 11 Drawing Sheets

(56) References Cited

U.S. PATENT DOCUMENTS

| | | | |
|---|---|---|---|
| 2009/0138805 A1* | 5/2009 | Hildreth | G06K 9/00335 |
| | | | 715/745 |
| 2009/0222336 A1* | 9/2009 | Etheridge, Jr. | G06Q 30/02 |
| | | | 705/14.58 |
| 2011/0212777 A1* | 9/2011 | Chen | A63F 13/235 |
| | | | 463/32 |
| 2014/0002619 A1* | 1/2014 | Morohoshi | H04N 21/4223 |
| | | | 348/51 |
| 2014/0375752 A1 | 12/2014 | Shoemake et al. | |

* cited by examiner

SYSTEMS AND METHODS FOR RECOMMENDING CONTENT

CROSS-REFERENCE TO RELATED APPLICATION

This application is a continuation of U.S. patent application Ser. No. 14/070,708, filed Nov. 4, 2013 (pending), the contents of which are hereby incorporated by reference herein in its entirety.

BACKGROUND

In conventional systems, a user has to login or otherwise select an account identity on their user equipment device in order to receive personalized content. For example, the user may login to their set-top box in order to receive recommended content for viewing including one or more of television broadcasts, streaming internet media, and on-demand programs.

The recommended content may be selected based on the user's profile associated with his or her login or account identity. For example, the user's profile may include viewing history and related viewing preferences for the user. However, if the user is not logged in, he or she may not receive the appropriate content recommendations. Additionally, if the user is not logged in, the user's viewing history or related viewing preferences may not be recorded in his or her user profile for future content recommendations.

Accordingly, there is a need for systems and methods that will alleviate the issues described above and aid in making better content recommendations for the user.

SUMMARY OF THE DISCLOSURE

Systems and methods for recommending content to a user are described. A user equipment device may be equipped with a built-in or separately connected image capturing device which may be used to pinpoint the location of the remote control when it is activated, thereby defining the specific location of the remote and the user. The relative location of the user in the room where the television is located may be associated with that particular user and used to automatically log in and access their user profile. This information may be used to enhance the television experience for the user by, e.g., recommending content.

In some implementations, when a button on the user's remote control device is pressed, the infrared (IR) device placed in the remote control device activates to send a signal to a sensor connected to the user equipment device. Upon receipt of the signal, the user equipment device may activate a built-in or separately connected camera to detect the location of the remote within the user's viewing area. As used herein, a "viewing area" refers to a finite distance from a display device typically associated with an area in which a user may be capable of viewing media assets and/or advertisements on the display device. In some embodiments, the size of the viewing area may vary depending on the particular display device. For example, a display device with a large screen size may have a greater viewing area than a display device with a small screen size. In some embodiments, the viewing area may correspond to the range of the image capturing device associated with the media application. For example, if the image capturing device can detect a user only within five feet of a display device, the viewing area associated with the display device may be only five feet. Various systems and methods for detecting users within a range of a media device, is discussed in, for example, Shimy et al., U.S. patent application Ser. No. 12/565,486, filed Sep. 23, 2009, which is hereby incorporated by reference herein in its entirety.

The user equipment may detect the location of the remote by identifying the location of the pixels within the camera sensor's field of view that are activated by the IR signal. The user equipment device may also approximate the distance of the remote from the user equipment device through the number of pixels that are triggered. The identification may be further, or alternatively, enhanced by placing two IR devices in the remote control device such that they are mounted at a known distance apart. The user equipment device may determine the location and distance accurately and additionally determine the orientation (angle) of the remote control device based on the location of the pixels activated by each IR signal and the known distance between the two IR devices.

Typically, the viewing areas where the user's television and/or set-top box are located have a consistent and unchanging arrangement of furniture. The number of possible seating positions within the viewing area is generally small, e.g., 4 to 6 and typically less than or equal to 10. In such situations, most users tend to sit in the same position or a few limited positions and operate their remote control device from their usual position. Therefore, the number of positions in which the remote control device may be detected when a button is pressed may correspond to the number of users in the viewing area. For example, if a user is always seated on his or her preferred couch seat, the location of the remote control device in the viewing area may be associated with the particular user. By defining the detected locations of the remote control device over multiple activations, the user equipment device may determine the number of users and his or her positions the viewing area.

In some implementations, the user equipment device may automatically detect and define user areas in the viewing area based on the positions where the remote control device is activated. Each user area may be associated with a user profile including viewing history and viewing preferences, such as volume, color, brightness, video quality, etc. The user equipment device may "learn" the correlation between a user area and the content selected from that user area by keeping track of the viewing history and related viewing preferences, e.g., by monitoring and storing the content selections the user makes and/or other interactions the user may have with the guidance application. The user equipment device may enhance the viewing experience for the user by retrieving their user profile and making personalized content recommendations to the user associated with the particular user area.

For example, a user "John" may always sit in a particular user area and mostly view action movies. When the remote control device is detected in that position, the user equipment device may make personalized content recommendations including action movies. In another example, a child "Mike" may mostly view content from another position and the user equipment device may recommend children's content when the remote control device is detected in that position. In some implementations, users may adapt to the user profile generation process and consciously use a fixed seating position in the viewing area to further refine their user profile and receive better content recommendations.

In some implementations, the user area defined for a particular user may be further refined based on time-based restrictions. For example, a given user area may be associated with user "John" during weekends but with his wife "Marie" during weekdays. The user equipment device may make better content recommendations to the user activating the remote control device by taking the day into account. When the remote is detected in the given user area on a weekday, the user equipment device may retrieve Marie's profile and make personalized content recommendations including soap operas of interest to Marie. However, when the remote is detected in the given user area on a weekend, the user equipment device may instead retrieve John's profile and make personalized content recommendations including football games of interest to John.

In some implementations, the systems and methods described herein include a method for recommending content. The method includes receiving input at a user equipment device from a remote control device operated by a user positioned in a viewing area. In response to receiving the input, an instruction is transmitted to activate an image capturing device. The method further includes receiving from the image capturing device an image of the viewing area. The method further includes analyzing the received image to detect a position of the remote control device. The method further includes retrieving from a storage device a profile for the user based on the determined position. The method further includes determining media content of interest to the user based on the retrieved profile. The method further includes generating a display recommending the media content to the user.

In some embodiments, the retrieved profile is includes a viewing history of media content selected when the remote control device is positioned in a vicinity of the determined position in the viewing area. For example, the remote control device may be positioned within 0.1 cm, 1 cm, 10 cm, or any other suitable distance in the vicinity of the determined position in the viewing area. In some embodiments, the viewing history includes the media content selected in a vicinity of a particular time and/or the media content selected on a particular day. For example, viewing history includes the media content selected within one second, one minute, one hour, or any other suitable time period in the vicinity of the particular time.

In some embodiments, analyzing the received image to detect a position of the remote control device includes receiving a signal from the remote control device that is captured in the image. The method further includes identifying location of one or more pixels that are activated in the image due to the signal from the remote control device, e.g., identifying location of pixels that have particular values corresponding to an infrared (IR) signal. The method further includes determining the position of the remote control device based on the identified location.

In some embodiments, the method further includes receiving two signals simultaneously from the remote control device at the image capturing device. The method further includes identifying a first location of pixels and a second location of pixels that are activated in the image due to the two signals from the remote control device. The method further includes retrieving a distance associated with the two signals and calculating a distance of the remote control device from the image capturing device and its location relative to the image capturing device in the viewing area based on the identified first and second locations and the retrieved distance. In some embodiments, the image capturing device is built in to the display device or separately connected but adjacent to the display device. In such embodiments, the calculated distance may be used to approximate the distance of the remote control device from the display device. The method further includes determining the position of the remote control device based on the identified first and second locations and the calculated distance. In some embodiments, the two signals are received simultaneously from two infrared (IR) devices included in the remote control device.

In some embodiments, the method further includes determining a location of a second user in the viewing area. The method further includes retrieving from the storage device a profile for the second user based on the location. The method further includes determining media content of interest no both users based on their profiles. In some embodiments, determining the location of the second user in the viewing area further includes analyzing the received image to detect silhouettes corresponding to one or more users. The method further includes retrieving from the storage device a silhouette for the second user. The method further includes comparing the retrieved silhouette for the second user to the silhouettes detected in the image. The method further includes determining the location of the second user in the viewing area based on the comparison.

In some embodiments, the method further includes receiving a plurality of inputs from the remote control device over a period of time. The method further includes receiving from the image capturing device a plurality of images of the viewing area over the period of time. The method further includes clustering a plurality of positions in the viewing area to define a user area based on the position of the remote control device in each captured image.

In some embodiments, the method further includes receiving a plurality of inputs from the remote control device over a period of time. The method further includes receiving from the image capturing device a plurality of images of the viewing area over the period of time. The method further includes determining a plurality of locations in the viewing area based on the position of the remote control device in each captured image. The method further includes determining a number of users and/or user areas in the viewing area over the period of time based on the plurality of locations.

In some embodiments, the method further includes receiving the image of the viewing area from the image capturing device. The method further includes analyzing the received image to detect the position of the remote control device and determining the user area associated with the detected position. The method further includes retrieving the profile for the user from the storage device based on the determined user area.

In some aspects, the systems and methods described herein include a system or apparatus for recommending content configured to execute the functionality described above.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for recommending content to a user. In some implementations, the systems and methods utilize a built-in or separately connected image capturing device to locate the position of the remote control device when it is activated in the viewing area, thereby defining the specific position of the remote and the user. As used herein, a "viewing area" refers to a finite distance from a display device typically associated with an area in which a user may be capable of viewing media assets and/or advertisements on the display device. In some embodiments, the size of the viewing area may vary depending on the particular display device. For example, a display device with a large screen size may have a greater viewing area than a display device with a small screen size. In some embodiments, the viewing area may correspond to the range of the detection modules associated with the media application. For example, if the detection module can detect a user only within five feet of a display device, the viewing area associated with the display device may be only five feet. Various systems and methods for detecting users within a range of a media device, is discussed in, for example, Shimy et al., U.S. patent application Ser. No. 12/565,436, filed Sep. 23, 2009, which is hereby incorporated by reference herein in its entirety.

The relative position of the user in the viewing area where the user equipment device is located may be associated with that particular user and used to automatically login and access their user profile. This information may be used to enhance the television experience for the user by, e.g., recommending content.

In some implementations, a user equipment device including control circuitry recommends content to a user. The control circuitry receives input at the user equipment device from a remote control device operated by a user positioned in a viewing area. For example, the input may be an infrared (IR) signal received from an IR device placed in the remote control device. In response to receiving the input, control circuitry transmits an instruction to activate an image capturing device, e.g., a built-in or separately connected camera. The control circuitry receives from the image capturing device an image of the viewing area and analyzes the image to detect a position of the remote control device. For example, the control circuitry may compare the image to one or more previously or subsequently captured images to determine the pixels activated in the image due to the IR signal. For instance, in response to detecting the signal with a sensor, the camera may rapidly take a series of pictures and then analyze them to determine the portion that is changing across the images.

Figure 5:
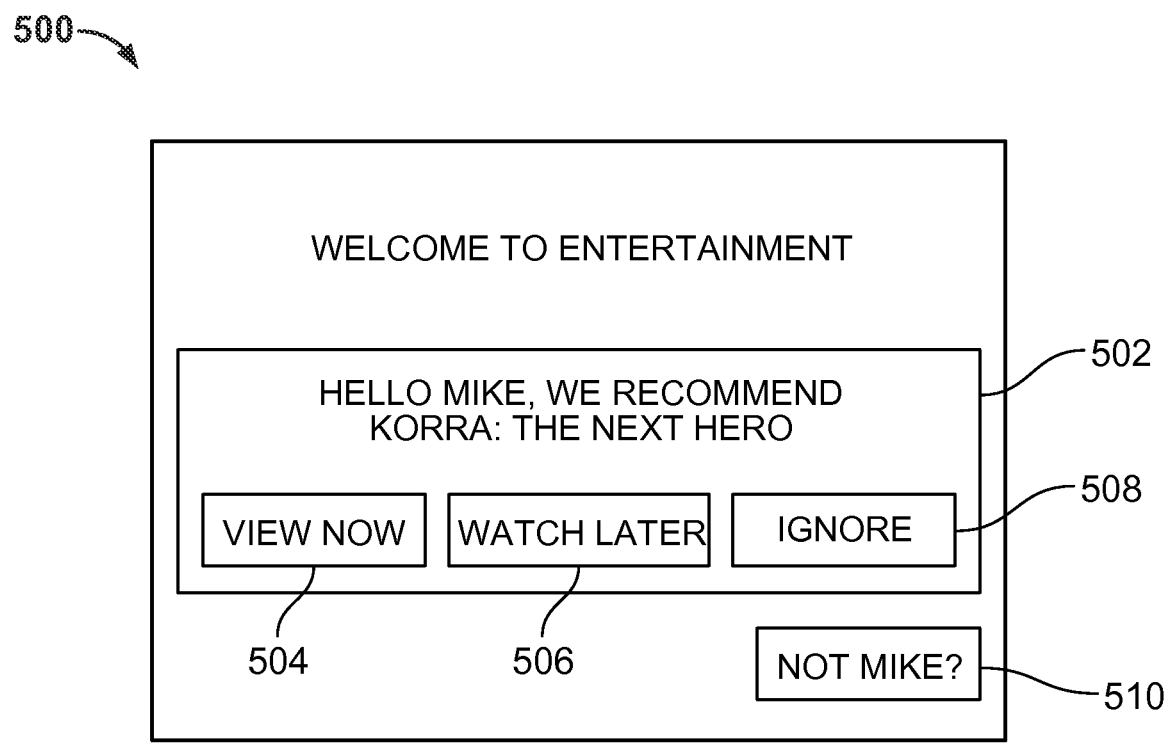
FIG. 5 is an illustrative display screen for providing recommended media content in accordance with some embodiments of the disclosure.

The control circuitry retrieves from a storage device a profile for the user based on the determined position and determines media content of interest to the user based on the retrieved profile. For example, the control circuitry may determine that the user "Mike" may find the television program "Korra: The Next Hero" of interest (as shown in FIG. 5 below). The control circuitry may make the determination by analyzing the viewing history in the user's profile and searching for programs similar to those previously viewed by the user. The control circuitry generates a display recommending the media content of interest to the user. Media recommendation displays and their functionalities are described in greater detail in Ellis et al. U.S. Pat. No. 6,898,762, issued May 24, 2005 and Corday et al. U.S. Patent Application Publication No. 2007/0157222, published. Jul. 5, 2007, which are hereby incorporated by reference herein in their entireties.

In some embodiments, the retrieved profile is based on a viewing history of media content selected when the remote control device is positioned in a vicinity of the determined position in the viewing area. For example, the remote control device may be positioned within 0.1 cm, 1 cm, 10 cm, or any other suitable distance in the vicinity of the determined position in the viewing area. In another example, the determined position may be associated with a user profile including viewing history and/or viewing preferences, such as volume, color, brightness, video quality, etc. The user equipment device may "learn" the correlation between the user area and the content viewed and may generate a profile for the user area.

In some embodiments, the viewing history includes the media content selected in a vicinity of a particular time and/or the media content selected on a particular day. For example, viewing history includes the media content selected within one second, one minute, one hour, or any other suitable time period in the vicinity of the particular time. In another example, a given user area may be associated with user "John" during weekends but with his wife "Marie" during weekdays. The user equipment device may make better content recommendations to the user activating the remote control device by taking the day into account. When the remote is detected in the given user area on a weekday, the user equipment device may retrieve Marie's profile and make personalized content recommendations including soap operas. However, when the remote is detected in the given user area on a weekend, the user equipment device may instead retrieve John's profile and make personalized content recommendations including football games.

In some embodiments, control circuitry analyzes the received image to detect a position of the remote control device by locating a signal from the remote control device that is captured in the image. For example, the received image may include a captured infrared (IR) signal received from the remote control device. The control circuitry identifies the location of one or more pixels that are activated in the image due to the IR signal from the remote control device. The control circuitry determines the position of the remote control device based on the identified location. For example, the control circuitry may compare the image to a previously captured image to determine the pixels activated in the image due to the IR signal.

In some embodiments, the control circuitry receives an indication of two signals simultaneously from the remote control device. For example, the remote control device may include two IR devices that send signals simultaneously to an IR sensor connected to the control circuitry. The control circuitry instructs the image capture device to capture an image and on receipt analyzes the image to identify a first location of pixels and a second location of pixels that are activated in the image due to the two signals from the remote control device.

The control circuitry retrieves a distance between the two IR devices placed in the remote control device. The distance is a fixed measure of the spacing between the two IR devices and may be used to calculate the distance of the remote control device from the image capturing device and its location relative to the image capturing device in the viewing area. The control circuitry calculates the distance of the remote control device from the image capturing device in the viewing area based on the first and second locations of the two IR signals in the captured image as well as the retrieved distance associated with the two IR signals. In some embodiments, the image capturing device is built in to the display device or separately connected but adjacent to the display device. In such embodiments, the calculated distance may be used to approximate the distance of the remote control device from the display device. The control circuitry determines the position of the remote control device in the viewing area based on the first and second positions corresponding to the pixels activated in the captured image due to the two IR signals and the calculated distance. The position in this case may be a 3-dimensional value indicating the position of the user in the viewing area.

In some embodiments, the control circuitry further determines a location of a second user in the viewing area. The control circuitry retrieves from the storage device a profile for the second user based on the location. The control circuitry makes media content recommendations such that they are of interest to both users based on their profiles. For example, the control circuitry may determine the location of the second user in the viewing area by analyzing the image from the image capture device to detect silhouettes corresponding to the users in the viewing area. The silhouettes may be detected using edge detection, corner detection, blob detection, or other such suitable image processing techniques. Such techniques are fundamental tools in image processing, machine vision and computer vision, particularly in the areas of feature detection and feature extraction. The control circuitry may identify points in an image at which the image brightness changes sharply or has discontinuities to determine silhouettes for the users in the viewing area. The control circuitry retrieves from the storage device a silhouette for the second user and compares the retrieved silhouette for the second user to the silhouettes detected in the image. If there is a match, the control circuitry associates the location in the viewing area with the profile of the second user.

In some embodiments, the control circuitry receives a plurality of inputs from the remote control device over a period of time and receives from the image capturing device a plurality of images of the viewing area over the same period of time. The control circuitry clusters the plurality of positions in the viewing area to define a user area based on the position of the remote control device in each captured image. The control circuitry associates the defined user area with the user. Any future remote control signals from the defined user area may be used to construct or retrieve the user's profile including a viewing history and/or viewing preferences, e.g., volume, brightness, video quality, etc.

In some embodiments, the control circuitry receives a plurality of inputs from the remote control device over a period of time and receives from the image capturing device a plurality of images of the viewing area over the same period of time. The control circuitry determines a plurality of locations in the viewing area based on the position of the remote control device in each captured image. The control circuitry determines a number of users in the viewing area over the period of time based on the plurality of locations. Any future remote control signals from the defined user areas may be used to construct or retrieve corresponding user profiles including a viewing history and/or viewing preferences, e.g., volume, brightness, video quality, etc.

In some embodiments, the control circuitry receives the image of the viewing area from the image capturing device. The control circuitry analyzes the received image to detect the position of the remote control device and determines the user area associated with the detected position. Finally, the control circuitry retrieves the profile for the user from the storage device based on the determined user area.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Media applications may take various forms depending on their function. Some media applications generate graphical user interface screens (e.g., that enable a user to navigate among, locate and select content), and some media applications may operate without generating graphical user interface screens (e.g., while still issuing instructions related to the transmission of media assets and advertisements).

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "display device," "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. These cameras, for example, can be used to capture an image of an IR signal from a remote control device, as discussed further herein. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media applications may be provided as on-line applications (i.e., provided on a website), or as stand-alone applications or clients on user equipment devices. Various devices and platforms that may implement media applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 1:
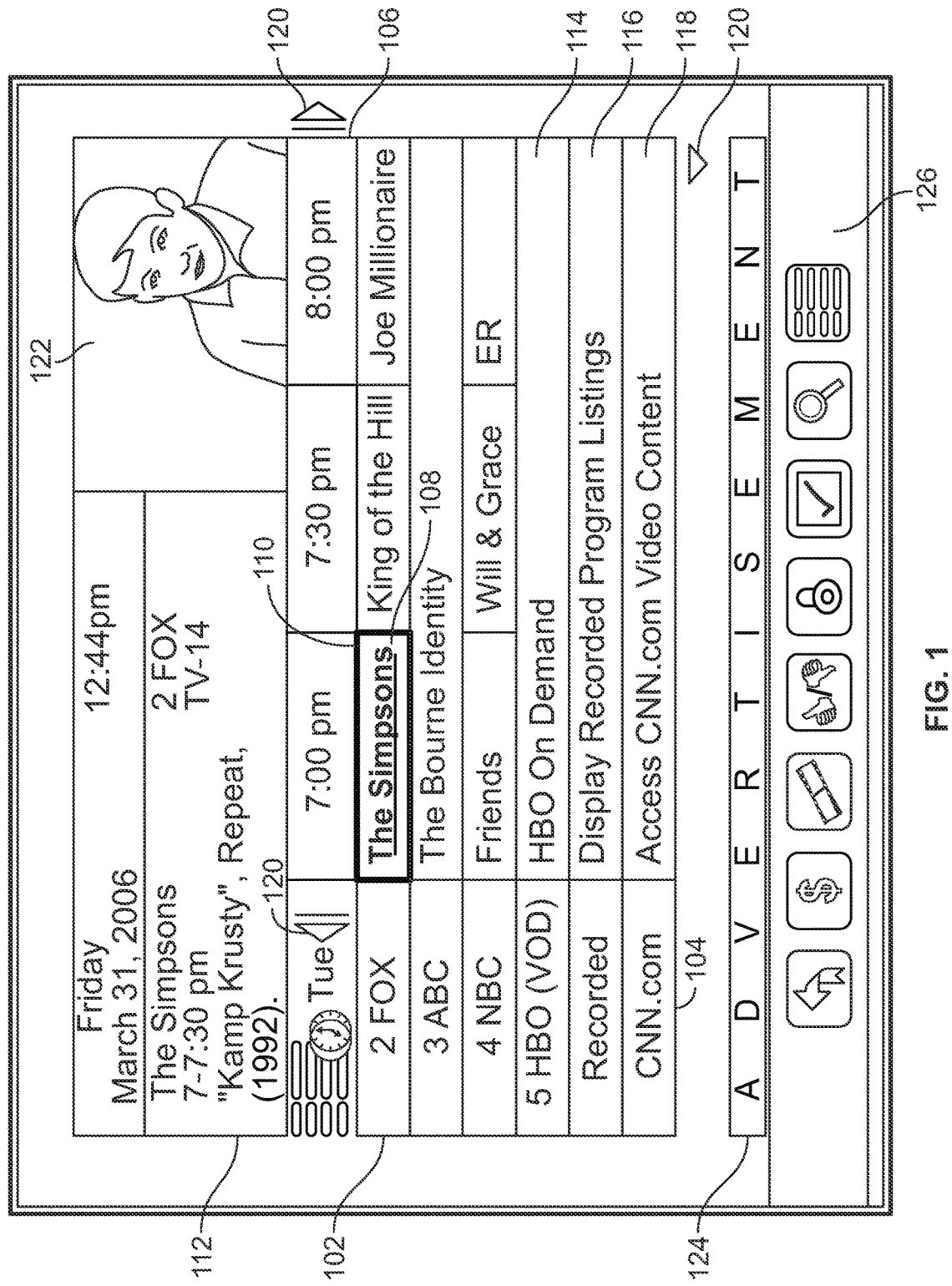
FIGS. 1 and 2 show illustrative display screens that may be used to provide media guidance application listings in accordance with some embodiments of the disclosure.
Figure 2:
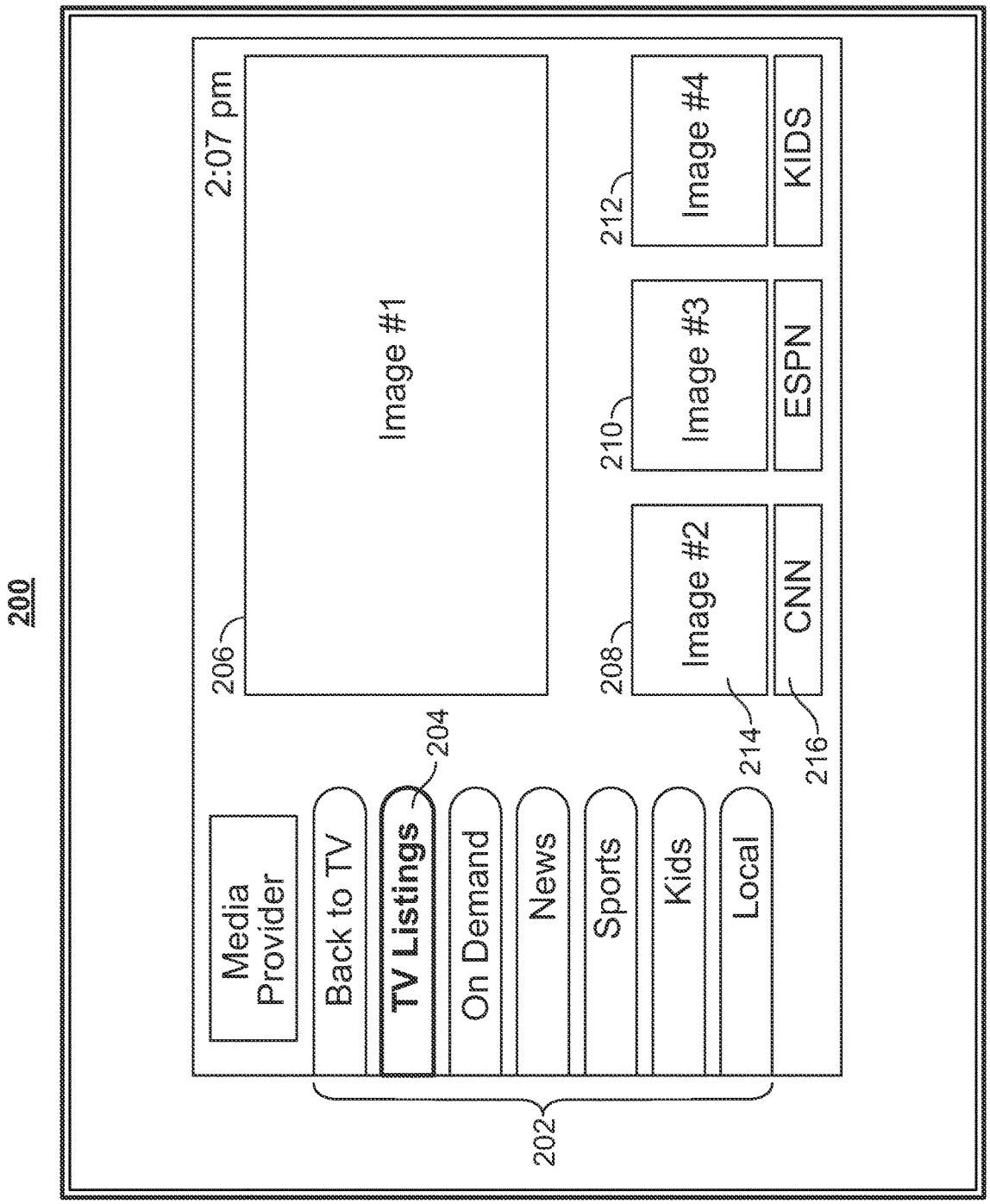

FIGS. 1-2 show illustrative display screens that may be used to provide media guidance data. The display screens shown in FIGS. 1-2 and 5A-9 may be implemented on any suitable user equipment device or platform. While the displays of FIGS. 1-2 and 5-6C are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to, or be unrelated to, one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a programs, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, options to view related content that provides background information or context for a selected media content, options to view the related content on a second screen device, options to view additional related content, options to add related content to a queue for later viewing, options to resume playback of the selected media content, options to specify an ordering scheme and/or criteria for the ordering scheme, or other suitable options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. In some embodiments, the user profile information may be associated with input received from a remote control device over a period of time. Control circuitry may determine the position of the remote control device in the user's viewing area and cluster the positions to define a user area. The control circuitry may associate the defined user area with the user and store the interactions including viewing history and/or viewing preferences in the user profile information. Any future remote control signals from the defined user area may be used to construct or retrieve the user's profile information.

Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4.

Additional personalized media guidance application features are described in greater detail in Ellis et al., U.S. Patent Application Publication. No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
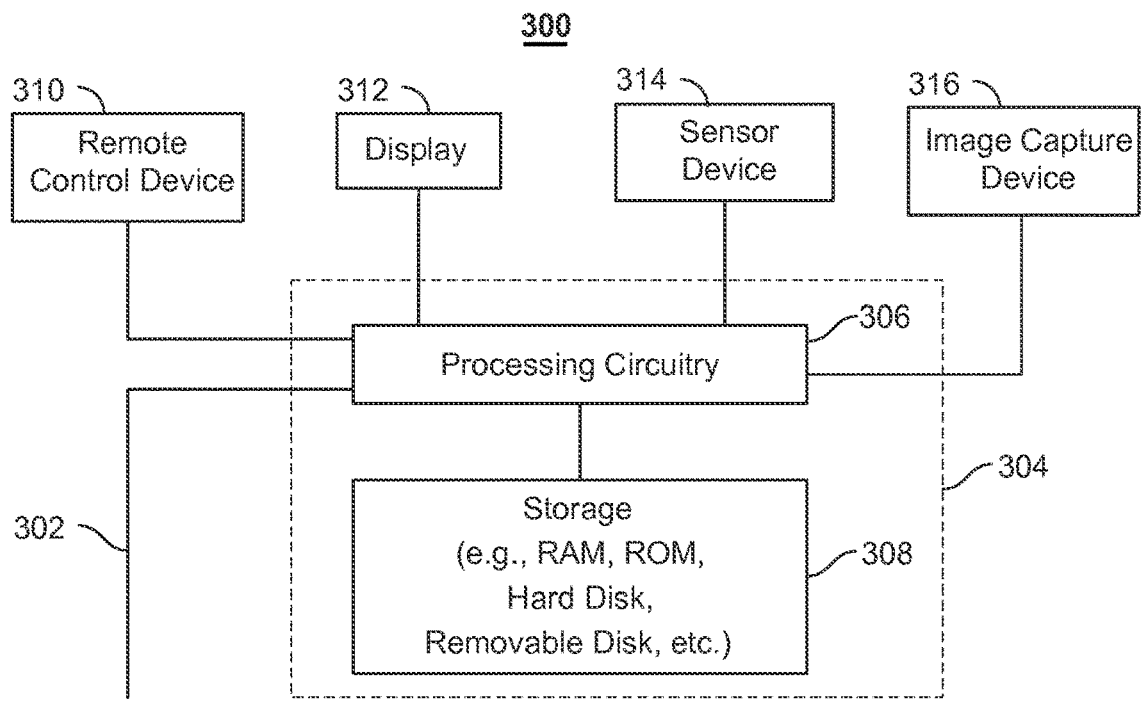
FIG. 3 is a block diagram of an illustrative user equipment device in accordance with some embodiments of the disclosure.

FIG. 3 is a block diagram of an illustrative user equipment device in accordance with some embodiments of the disclosure. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media application stored in memory (i.e., storage 308). Specifically, control circuitry 304 may be instructed by the media application to perform the functions discussed above and below. For example, the media application may provide instructions to control circuitry 304 to generate the media guidance displays. In some implementations, any action performed by control circuitry 304 may be based on instructions received from the media application.

In client-server based embodiments, control circuitry 304 may include communications circuitry suitable for communicating with a media-application server or other networks or servers. The instructions for carrying out the above mentioned functionality may be stored on the media application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and media application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive advertisement data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using a user input interface, e.g., remote control device 310. Remote control device 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Sensor device 314 may be provided as integrated with other elements of user equipment device 300 or may be stand-alone units. Sensor device 314 may receive signals from remote control device 310 and indicate receipt of such signals to control circuitry 304. In some embodiments, sensor device 314 is an infrared (IR) receiver that receives IR signals from remote control device 310. In some embodiments, sensor 314 includes multiple IR receivers that receive IR signals from remote control device 310. Image capture device 316 may be provided as integrated with other elements of user equipment device 300 or may be stand-alone units. Image capture device 316 may capture images of a viewing area where the user is positioned when a signal is received from remote control device 310. The captured images may be used to determine the location of the user in the viewing area.

The media application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media application is a client-server based application. Data for use by a thick or thin client implemented on user equipment device 300 is retrieved on-demand by issuing requests to a server remote to the user equipment device 300. In one example of a client-server based media application, control circuitry 304 runs a web browser that interprets web pages provided by a remote server.

In some embodiments, the media application is downloaded and interpreted or otherwise run by an interpreter or virtual machine (run by control circuitry 304). In some embodiments, the media application may be encoded in the ETV Binary Interchange Format (EBIF), received by control circuitry 304 as part of a suitable feed, and interpreted by a user agent running on control circuitry 304. For example, the media application may be an EBIF application. In some embodiments, the media application may be defined by a series of JAVA-based files that are received and run by a local virtual machine or other suitable middleware executed by control circuitry 304. In some of such embodiments (e.g., those employing MPEG-2 or other digital media encoding schemes), the media application may be, for example, encoded and transmitted in an MPEG-2 object carousel with the MPEG audio and video packets of a program.

Figure 4:
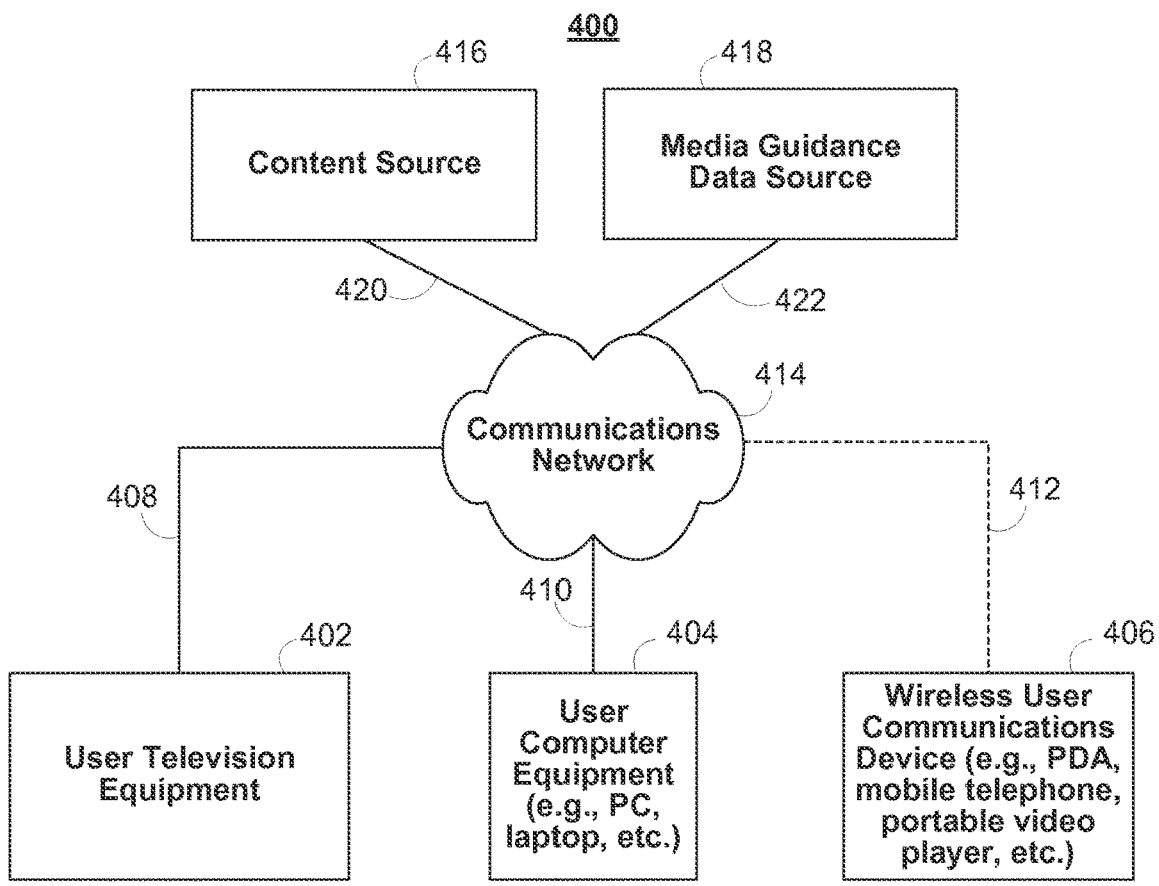
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media application may have the same layout on various different types of user equipment or may be tailored to the display capabilities of the user equipment. For example, on user computer equipment 404, the media application may be provided as a website accessed by a web browser. In another example, the media application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the media application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the media application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data Source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull advertisement data from a server, or a server may push advertisement data to a user equipment device. In some embodiments, a media application client residing on the user's equipment may initiate sessions with source 418 to obtain advertisement data when needed, e.g., when the advertisement data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.).

Media guidance data source 418 may provide user equipment devices 402, 404, and 406 the media application itself or software updates for the media application.

Media applications may be, for example, stand-alone applications implemented on user equipment devices. For example, the media application may be implemented as software or a set of executable instructions which may be stored in storage 308, and executed by control circuitry 304 of a user equipment device 300. In some embodiments, media applications may be client-server applications where only a client application resides on the user equipment device, and server application resides on a remote server. For example, media applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media application may instruct the control circuitry to generate the media application displays and transmit the generated displays to the user equipment devices. The server application may instruct the control circuitry of the media guidance data source 418 to transmit data for storage on the user equipment. The client application may instruct control circuitry of the receiving user equipment to generate the media application displays.

Content and/or advertisement data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide advertisement data described above. In addition to content and/or advertisement data, providers of OTT content can distribute media applications (e.g., web-based applications or cloud-based applications), or the content can be displayed by media applications stored on the user equipment device.

Media guidance system 400 is intended to illustrate a number of approaches, or network configurations, by which user equipment devices and sources of content and advertisement data may communicate with each other for the purpose of accessing content and providing media guidance. The embodiments described herein may re applied in any one or a subset, of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may re desirable for various media guidance information or settings to be communicated between the different user equipment devices. For example, it may be desirable for users to maintain consistent media application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media application implemented on a remote device. For example, users may access an online media application on a website via personal computers at their offices, or mobile devices such as a PDA or web-enabled mobile telephone. The user may set various settings (e.g., recordings, reminders, or other settings) on the online media application to control the user's in-home equipment. The online guide may control the user's equipment directly, or by communicating with a media application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media application to communicate directly with content source 416 to access content. Specifically, within a home, users of user television equipment 402 and user computer equipment 404 may access the media application to navigate among and locate desirable content. Users may also access the media application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition, or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

The media application may incorporate, or have access to, one or more content capture devices or application, such as camcorders, digital cameras with video mode, audio recorders, mobile phones, and handheld computing devices, to generate data describing the attentiveness level of a user. The user can upload data describing the attentiveness level of a user to a content storage service on the cloud either directly, for example, from user computer equipment 404 or wireless user communications device 406 having a content capture feature. Alternatively, the user can first transfer the content to a user equipment device, such as user computer equipment 404. The user equipment device storing the data describing the attentiveness level of a user uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 is an illustrative display screen 500 for providing recommended media content in an interactive media guidance application in accordance with some embodiments of the disclosure. In FIG. 5, display screen 500 including prompt 502 may be generated automatically or responsive co a request from the user. Screen 500 may further include options 504, 506, 508, and 510 to assist the user receiving the recommended content. In some implementations, control circuitry 304 may generate screen 500 in response to receiving input from remote control device 310 held by the user. Control circuitry 304 may analyze the viewing area to determine the position of remote control device 310 and retrieve the user's profile based on the determined position. Control circuitry 304 may determine media content of interest to the user and generate screen 500 for recommending the media content to the user.

For example, control circuitry 304 may recommend to user "Mike" the television program "Korra: The Next Hero" as shown in FIG. 5. The user may select option 504 to view the recommended program. Alternatively, the user may select option 506 to add the program to a queue for viewing at a later item. The user may also select option 508 to ignore the recommendation and continue interacting with the media guidance application. Finally, if the user realizes that control circuitry 304 retrieved a user profile for another user, i.e., the user is not "Mike," the user may select option 510 to select the correct profile or to manually enter position information for determining the correct user profile as discussed in FIGS. 6A-6C below. Media recommendation displays and their functionalities are described in greater detail in Ellis et al. U.S. Pat. No. 6,898,762, issued May 24, 2005 and Corday et al. U.S. Patient Application Publication No. 2007/0157222, published Jul. 5, 2007, which are hereby incorporated by reference herein in their entireties.

Figure 6A:
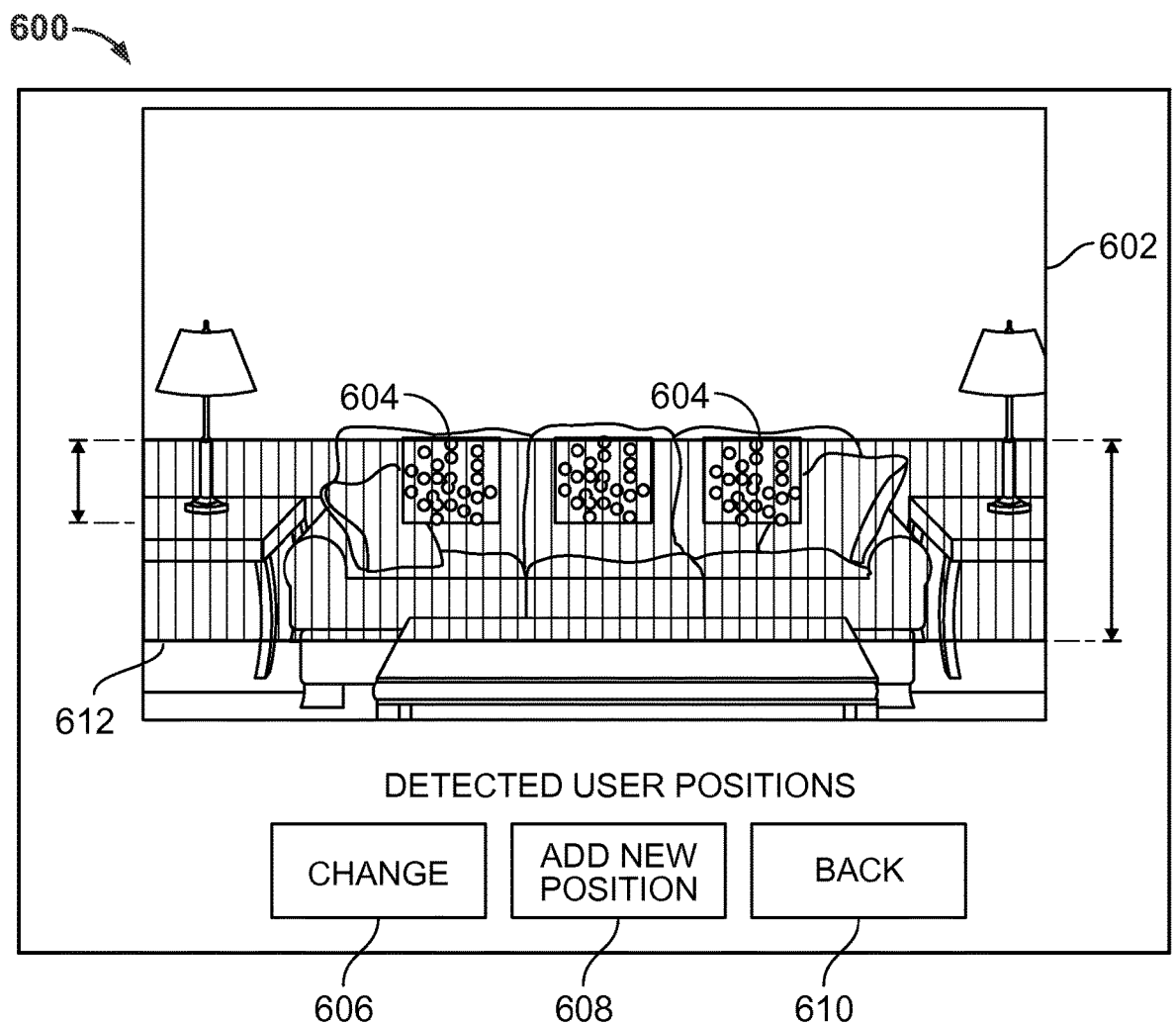
FIGS. 6A, 6B, and 6C are illustrative display screens for customizing the user's location in accordance with some embodiments of the disclosure.

FIG. 6A is an illustrative display screen 600 for customizing the user's location in accordance with some embodiments of the disclosure. In some implementations, the user may manually modify or add positions in the viewing area to associate with a user profile via display screen 600. The user profile may be constructed or retrieved based on viewing history or viewing preferences received via remote control device 310 from a given user position. Display screen 600 may be generated in response to receiving a user selection of option 510 shown in FIG. 5. Display screen 600 includes area 602 which shows an image of the viewing area captured using image capturing device 316. Control circuitry 304 may generate area 602 for display along with user areas 604 in the viewing area associated with respective user profiles. For example, screen 600 shows user areas 604 associated with different user profiles. Each mark in user area 604 indicates a stored user position from where an infrared signal was received from remote control device 310. Each user area 604 may be defined as a result of clustering the stored user positions. This clustering is described further with reference to FIGS. 9A and 9B, below. Band 612 shows the typical positions in the viewing area from which remote control device signals may be received. The screen further includes options 606 and 608 for modifying and adding new positions in the viewing area, respectively. Alternatively, the user may select option 610 to go back to the previous screen. Selecting either option 606 or 608 may lead to a screen similar to the one illustrated in FIG. 6B. The user may correct any erroneous user profile associations or add a new user position to generate their user profile going forward.

Figure 6B:
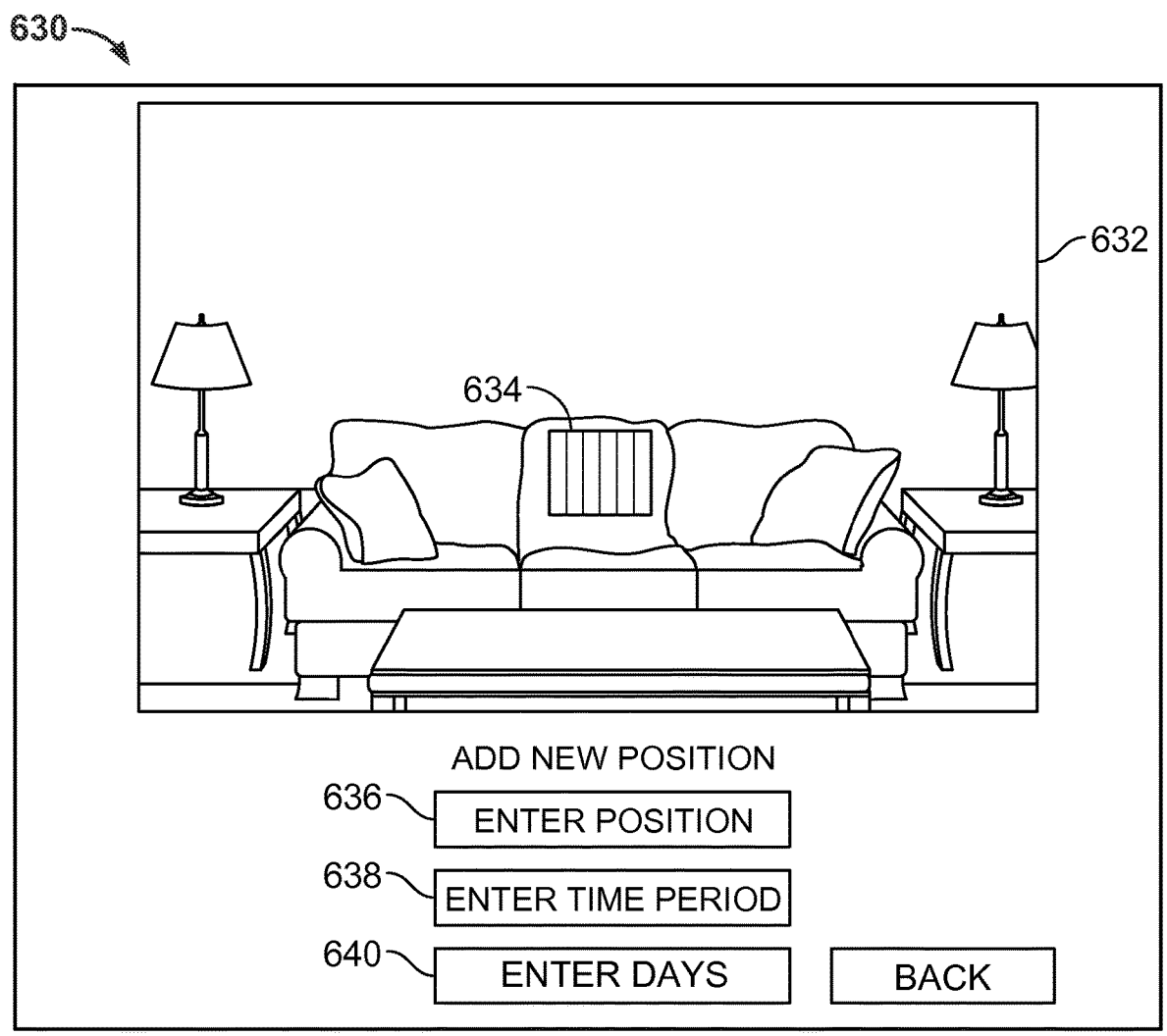

FIG. 6B is another illustrative display screen 630 for customizing the user's location in accordance with some embodiments of the disclosure. Display screen 630 may be generated in response to receiving a user selection of option 510 shown in FIG. 5 or options 606 or 608 in FIG. 6A. Display screen 630 includes area 632 which shows an image of the viewing area captured using image capturing device 316. Control circuitry 304 may generate area 632 for display along with a selectable user area window 634 in the viewing area for association with a particular user profile. The user may specify a particular position for themselves in the viewing area by selecting option 636 and using window 634 to indicate the desired user area. In addition, the user may specify time-based restrictions on the indicated user area. For example, the user may specify via option 638 that the indicated user area should be associated with the user only during 5 p.m. through 9 p.m. In another example, the user may specify via option 670 that the user area should be associated with the user only during Monday through Friday.

Based on the information entered, control circuitry 304 may send instructions to construct or retrieve a user profile for the associated user position using viewing history and/or viewing preferences received from remote control device 310 during the specified time-based restrictions.

Figure 6C:
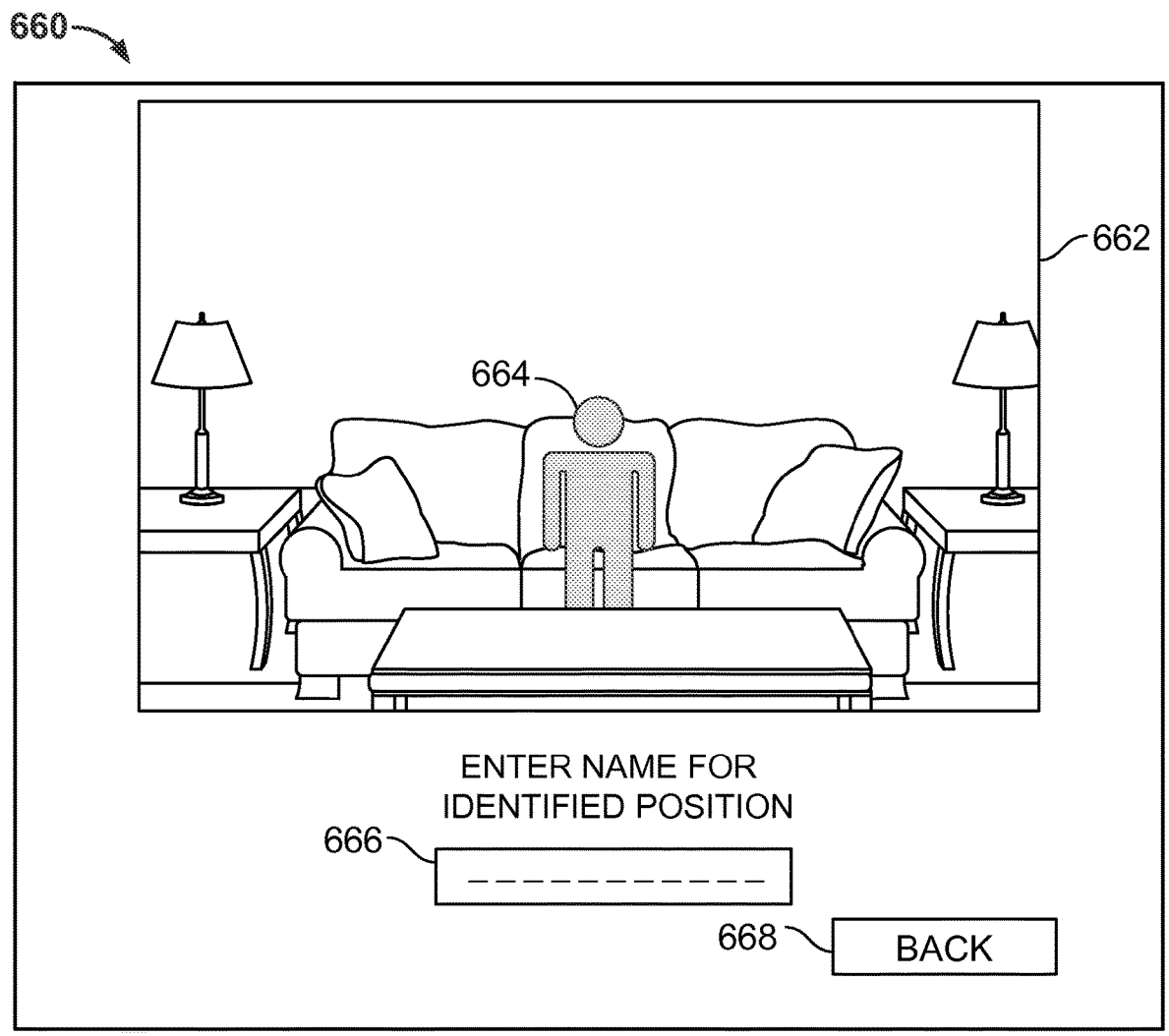

FIG. 6C is another illustrative display screen 660 for customizing the user's location in accordance with some embodiments of the disclosure. Display screen 660 may be generated after receiving a plurality of input signals from remote control device 310 in viewing area 662 over a period of time. In some embodiments, display screen 660 is generated after a user-specified number of input signals are received. In some embodiments, display screen 660 is generated after a sufficient number of input signals are received in order to perform clustering. Control circuitry 304 may cluster the plurality of input signals in viewing area 662 to define user area 664. Display screen 660 may display user area 664 and request that the user enter a name in prompt 666 to associate with user area 664. Once the name is received, control circuitry 304 may associate user area 664 with the user's name and a corresponding user profile. Any future remote control signals from user area 664 may be used to retrieve or further refine the user's profile including a viewing history and/or viewing preferences, e.g., volume, brightness, video quality, etc. Alternatively, the user may select option 668 to go back to the previous screen without associating user area 664 with the user's name. In some embodiments, selecting option 668 may lead to a screen similar to the one illustrated in FIG. 6B. The screen may allow the user to correct any erroneously identified positions or add a new user position to generate their user profile going forward.

Figure 7:
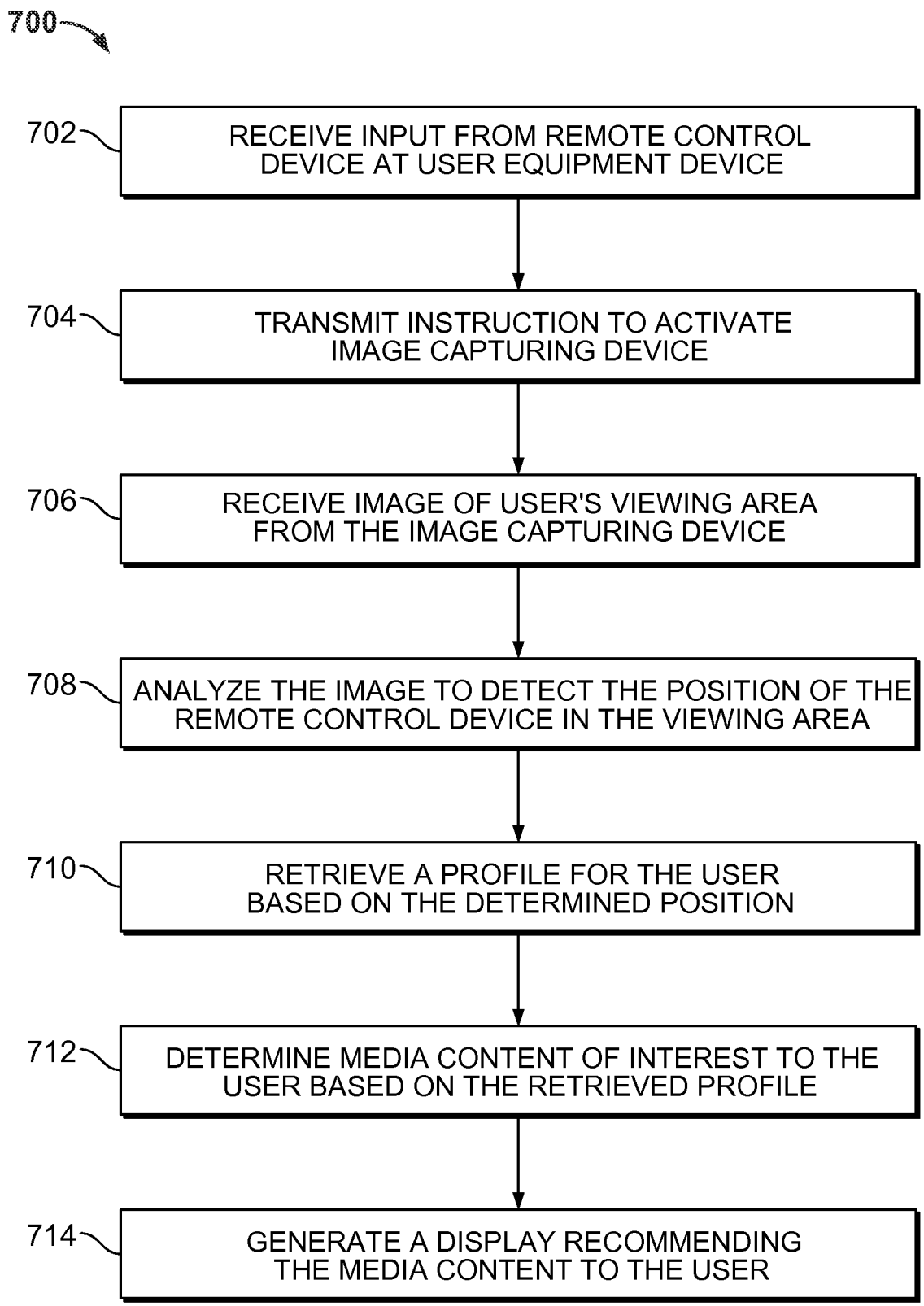
FIG. 7 is a flowchart of illustrative steps for detecting user location and making media content recommendations in accordance with some embodiments of the disclosure.

FIG. 7 is a flowchart 700 of illustrative steps for detecting user location and making media content recommendations in accordance with some embodiments of the disclosure. At step 702, sensor device 314 receives user input from remote control device 310. In some implementations, the user input includes an infrared (IR) signal from remote control device 310. Sensor device 314 sends an indication to control circuitry 304. At step 704, control circuitry 304 transmits an instruction to activate image capture device 316 to capture an image of the viewing area. At step 706, control circuitry 304 receives the image from image capture device 316. At step 708, control circuitry 304 analyzes the image to detect a position of remote control device 316 in the viewing area. In some implementations, control circuitry 304 identifies the location of pixels that are activated in the image due to the IR signal from remote control device 316. In some implementations, control circuitry 304 identifies a position of remote control device 316 using edge detection, corner detection, blob detection, or other such suitable image processing techniques. Such techniques are fundamental tools in image processing, machine vision and computer vision, particularly in the areas of feature detection and feature extraction. Control circuitry 304 may identify points in an image at which the image brightness changes sharply or has discontinuities to determine the position where the infrared signal is transmitted from remote control device 316 in the viewing area.

At step 710, control circuitry 304 retrieves a profile for the user based on the determined position in the viewing area. The user profile may include viewing history and/or viewing preferences for the user who typically uses remote control device 316 from the determined position in the viewing area. At step 712, control circuitry 304 determines media content of interest to the user based on their profile. For example, the control circuitry 304 may analyze the viewing history to determine programs similar to those previously viewed by the user. At step 714, control circuitry 304 generates a display for recommending the media content to the user.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure.

Figure 8A:
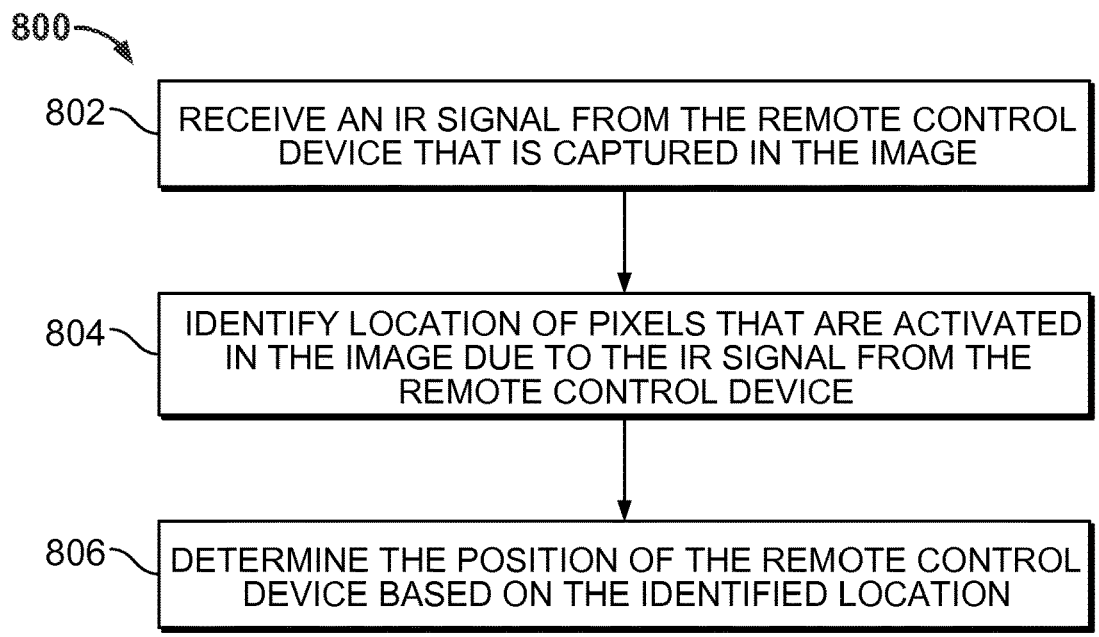
FIGS. 8A and 8B are flowcharts of illustrative steps for determining user location in accordance with some embodiments of the disclosure.

FIG. 8A is a flowchart 800 of illustrative steps for determining user location in accordance with some embodiments of the disclosure. In some implementations, control circuitry 304 follows process 800 at step 708 of FIG. 7. At step 802, sensor device 314 receives an infrared (IR) signal from remote control device 310. Sensor device 314 sends an indication to control circuitry 304, which in turn sends an instruction to image capture device 316 to capture an image of the viewing area. At step 804, control circuitry 304 analyzes the image received from image capture device 316 to detect a position of remote control device 316 in the viewing area. In particular, control circuitry 304 identifies the location of pixels that are activated in the image due to the IR signal from remote control device 316. For example, control circuitry 304 may compare the image to one or more previously or subsequently captured images to determine the pixels activated in the image due to the IR signal. At step 806, control circuitry 304 determines the position of remote control device 310 in the viewing area to be the position corresponding to the pixels activated in the captured image.

It is contemplated that the steps or descriptions of FIG. 8A may be used with any other embodiment of this disclosure. In addition, the steps and descriptions described in relation to FIG. 8A may be done in alternative orders or in parallel to further the purposes of this disclosure.

Figure 8B:
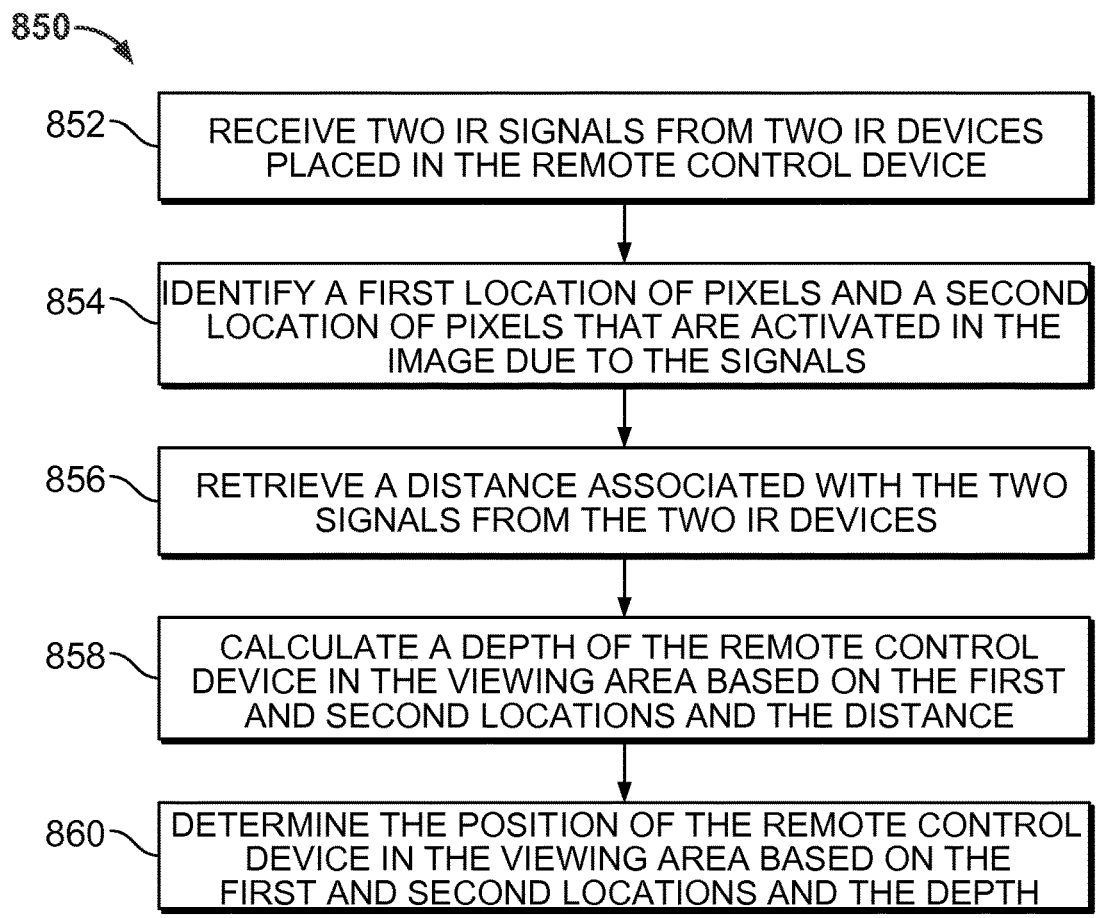

FIG. 8B is another flowchart 850 of illustrative steps for determining user location in accordance with some embodiments of the disclosure. In some implementations, control circuitry 304 follows process 850 at step 708 of FIG. 7. At step 852, sensor device 314 receives two infrared (IR) signals from two IR devices placed in remote control device 310. Sensor device 314 sends an indication to control circuitry 304, which in turn sends an instruction to image capture device 316 to capture an image of the viewing area. At step 854, control circuitry 304 analyzes the image received from image capture device 316 to detect a position of remote control device 316 in the viewing area. In particular, control circuitry 304 identifies the location of pixels that are activated in the image due to the two IR signals from remote control device 316. For example, control circuitry 304 may compare the image to a previously captured image to determine the pixels activated in the image due to the two IR signals.

At step 856, control circuitry 304 retrieves a distance between the two IR devices placed in remote control device 316. The distance is a fixed measure of the spacing between the two IR devices and may be used to calculate the distance of remote control device 316 from image capture device 316 and its location relative to image capture device 316 in the viewing area. At step 858, control circuitry 304 calculates the distance of remote control device 316 from image capture device 316 in the viewing area based on the first and second locations of the two IR signals in the captured image as well as the retrieved distance associated with the two IR signals. In some embodiments, image capture device 316 is built in to the display device or separately connected but adjacent to the display device. In such embodiments, the calculated distance may be used to approximate the distance of remote control device 316 from the display device. At step 860, control circuitry 304 determines the position of remote control device 310 in the viewing area based on the first and second positions corresponding to the pixels activated in the captured image due to the two IR signals and the calculated distance. The position in this case is a 3-dimensional value indicating the position of the user in the viewing area.

It is contemplated that the steps or descriptions of FIG. 8B may be used with any other embodiment of this disclosure. In addition, the steps and descriptions described in relation to FIG. 8B may be done in alternative orders or in parallel to further the purposes of this disclosure.

Figure 9A:
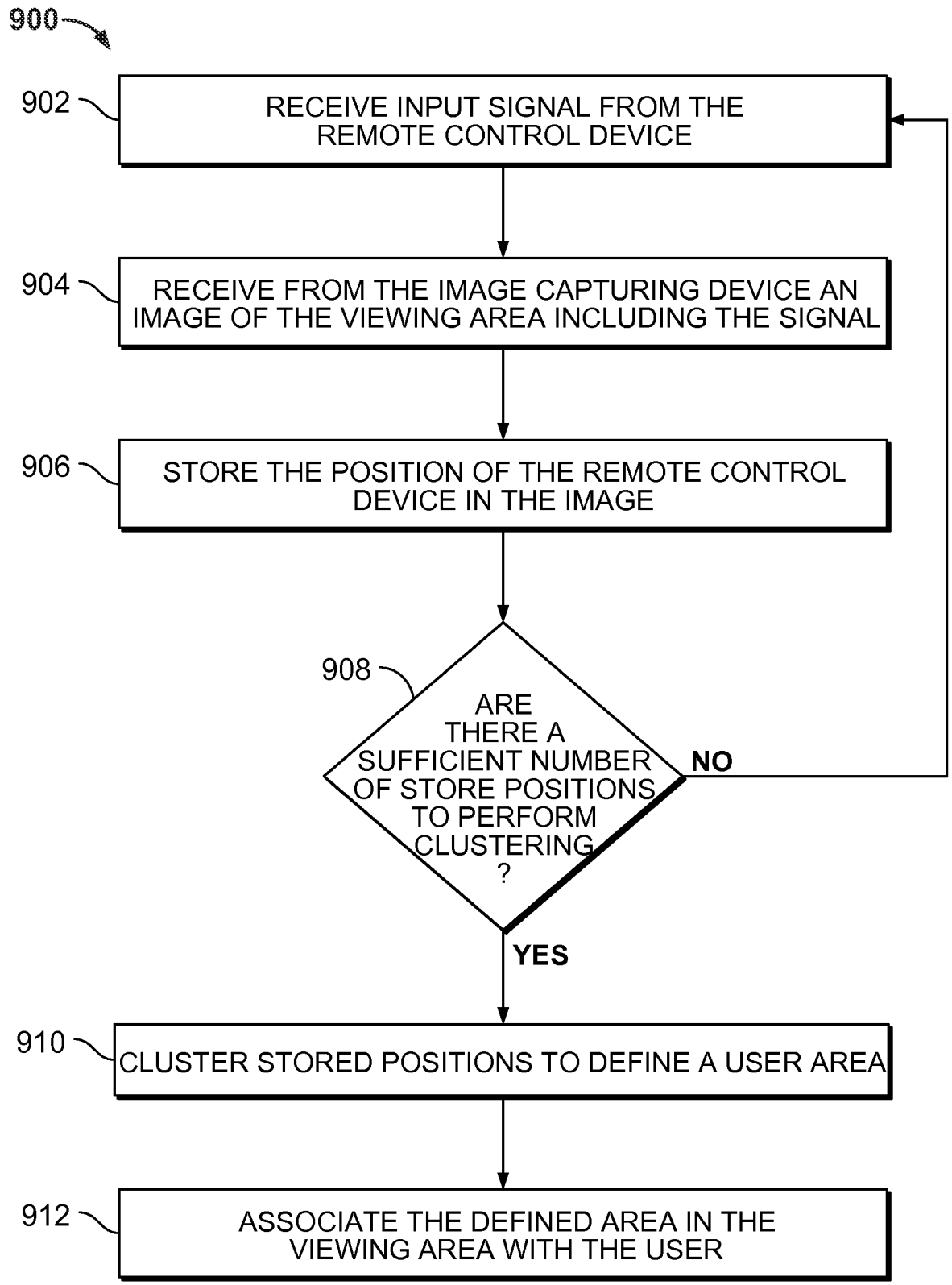
FIGS. 9A and 9B are flowcharts of illustrative steps for defining portions of the viewing area associated with one or more users in accordance with some embodiments of the disclosure.

FIG. 9A is a flowchart 900 of illustrative steps for defining portions of the viewing area associated with a user in accordance with some embodiments of the disclosure. In some implementations, the different captured positions of remote control device 316 in the viewing area may be clustered and associated with a user profile. At step 902, sensor device 314 receives an input signal from remote control device 310. Sensor device 314 sends an indication to control circuitry 304, which in turn sends art instruction to image capture device 316 to capture an image of the viewing area. At step 904, control circuitry 304 receives the image of the viewing area from image capture device 316.

At step 906, control circuitry 304 analyzes the image to identify the position of remote control device 316 in the viewing area according to one of the implementations described above and stores the position for later retrieval. At step 908, control circuitry 304 checks whether a sufficient number of positions have been stored to perform clustering on the stored positions. For example, control circuitry 304 may check against a predetermined threshold or determine a threshold for number of positions based on the size of the viewing area. If more positions are needed, control circuitry 304 returns to step 902. If sufficient positions have been stored, control circuitry 304 proceeds to step 910. At step 910, control circuitry 304 performs clustering on the stored user positions to define one or more user areas.

Clustering is the task of grouping a set of objects in such a way that objects in the same cluster are more similar to each other than to those in other clusters. It is a common technique for statistical data analysis used in many fields, including machine learning, pattern recognition, image analysis, information retrieval, and bioinformatics. Cluster analysis may be performed by various algorithms that differ significantly in their notion of what constitutes a cluster and how to efficiently find them. Popular notions of clusters include groups with small distances among the cluster members, dense areas of the data space, intervals or particular statistical distributions. For example, if most of the stored positions are concentrated in a particular portion of the viewing area, control circuitry 304 may cluster the stored positions into one user area. At step 912, control circuitry 304 associates the defined user area with a particular user. Any future remote control signals from the defined user area may be used to construct or retrieve a user profile including a viewing history and/or viewing preferences, e.g., volume, color, brightness, video quality, etc.

It is contemplated that the steps or descriptions of FIG. 9A may be used with any other embodiment of this disclosure. In addition, the steps and descriptions described in relation to FIG. 9A may be done in alternative orders or in parallel to further the purposes of this disclosure.

Figure 9B:
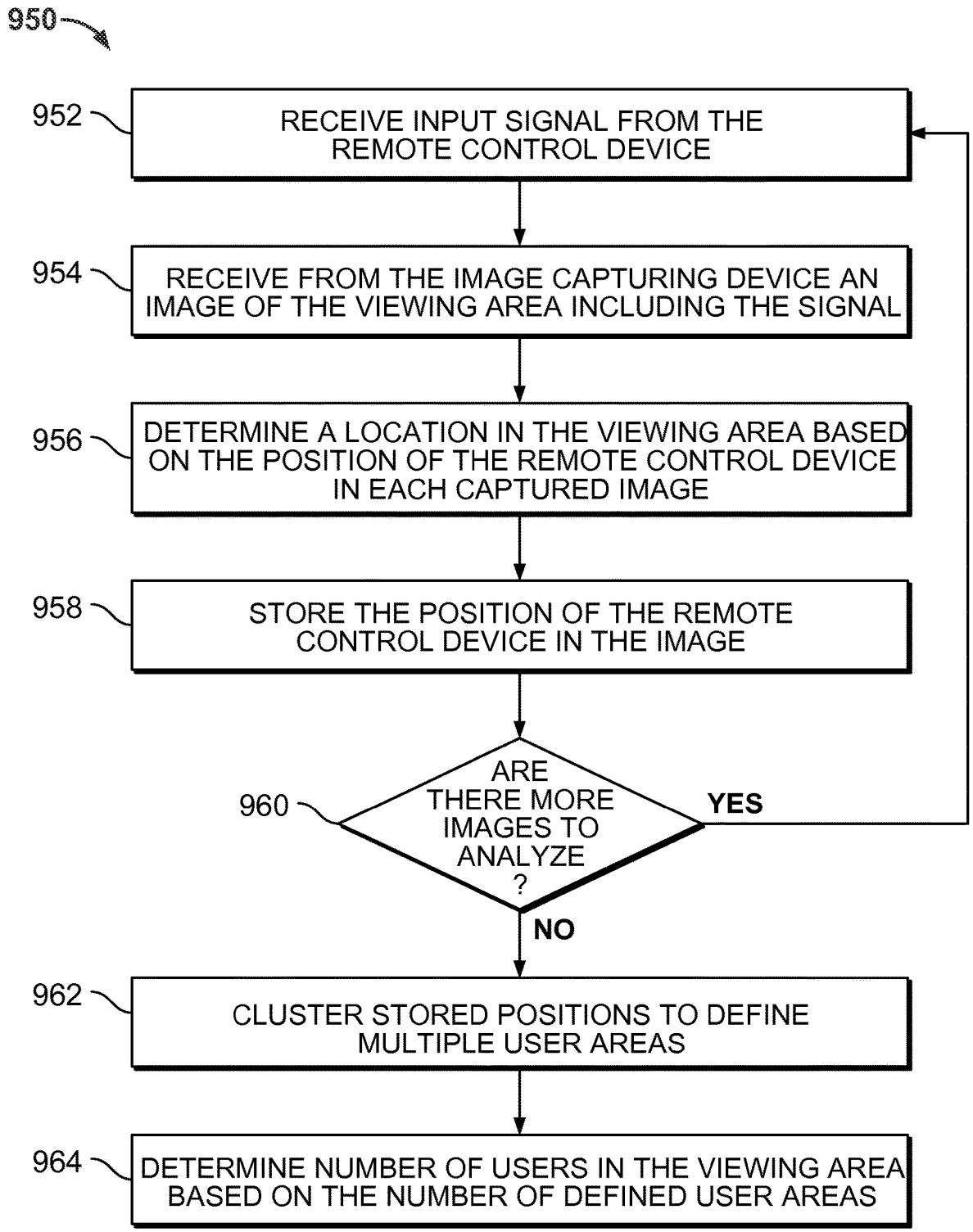

FIG. 9B is a flowchart 950 of illustrative, steps for defining portions of the viewing area associated with multiple users in accordance with some embodiments of the disclosure. Control circuitry 304 determines multiple users in the viewing area by analyzing images collected over a period of time to determine the multiple users. In some implementations, each position of remote control device 316 in the viewing area may be associated with a different user profile. In some implementations, the different captured positions over a period of time of remote control device 316 in the viewing area may be clustered and each cluster associated with a different user profile. At step 952, sensor device 314 receives an input signal from remote control device 310. Sensor device 314 sends an indication to control circuitry 304, which in turn sends an instruction to image capture device 316 to capture an image of the viewing area. At step 954, control circuitry 304 receives the image of the viewing area from image capture device 316.

At step 956, control circuitry 304 analyzes the image to identify the position of remote control device 316 in the viewing area according to one of the implementations described above. At step 958, control circuitry 304 stores the position for later retrieval. At step 960, control circuitry 304 checks whether additional images remain to be analyzed from the images that have been received over the given period of time. If additional images remain to be analyzed, control circuitry 304 returns to step 952. If all images have been analyzed, control circuitry 304 proceeds to step 962. At step 962, control circuitry 304 performs clustering on the stored user positions to define multiple user areas. At step 912, control circuitry 304 associates each defined user area with a different user. Any future remote control signals from the defined user areas may be used to construct or retrieve corresponding user profiles including a viewing history and/or viewing preferences, e.g., volume, brightness, video quality, etc.

It is contemplated that the steps or descriptions of FIG. 9B may be used with any other embodiment of this disclosure. In addition, the steps and descriptions described in relation to FIG. 9B may be done in alternative orders or in parallel to further the purposes of this disclosure.

In some implementations, the user equipment device may automatically detect and define user areas in the viewing area based on the positions where the remote control device is activated during particular time periods, e.g., particular blocks of time and/or particular days. The user equipment device may "learn" the correlation between a user area and the content selected from that user area by keeping track of the viewing history and related viewing preferences, e.g., by monitoring and storing the content selections the user makes and/or other interactions the user may have with the guidance application. Each user area may be associated with a user profile including viewing history and viewing preferences for the given time period.

For example, when the remote is detected in the user area on a weekday, the user equipment device may retrieve profile A and make personalized content recommendations including soap operas. However, when the remote is detected in the user area on a weekend, the user equipment device may instead retrieve profile B and make personalized content recommendations including football games. In another example, when the remote is detected in the user area between 9 am and 12 pm, the user equipment device may retrieve profile C and make personalized content recommendations including day time shows. However, when the remote is detected in the user area between 6 pm and 9 pm, the user equipment device may instead retrieve profile D and make personalized content recommendations including prime time shows.

The user equipment device may automatically determine the time period or the user equipment device may receive user input defining the time period. In some embodiments, the user equipment device analyzes the viewing history and related viewing preferences and clusters them to determine time periods. For example, the user equipment device may analyze the viewing history and cluster the soap operas into cluster A' to form profile A for weekdays. The user equipment device may analyze the viewing history and cluster the football games into cluster B' to form profile B for weekends. In another example, the user equipment device may analyze the viewing history and cluster the day time shows into cluster C' to form profile C for the time period between 9 am and 12 pm. The user equipment device may analyze the viewing history and cluster the prime time shows into cluster D' to form profile D for the time period between 6 pm and 9 pm.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for recommending content, the method comprising:
    receiving, at a user equipment device, input from a remote control device positioned in a viewing area;
    in response to receiving the input, receiving, from an image capturing device, a first image of the viewing area;
    retrieving data mapping respective profiles to each respective seating position of a plurality of seating positions in the viewing area;
    identifying, based on the first image of the viewing area, a first seating position of the plurality of seating positions within which the remote control device is positioned;
    identifying, based on the identified first seating position and the data mapping respective profiles to each respective seating position, a first profile corresponding to the identified first seating position;
    retrieving the first profile;
    determining, based on the first profile, a media content recommendation; and
    generating for display the media content recommendation.

2. The method of claim 1, further comprising accessing, from a storage device, the first profile, wherein the first profile includes a viewing history of media content selected when the remote control device was positioned within the first seating position in the viewing area.

3. The method of claim 2, wherein the viewing history includes at least one of (i) media content selected in a vicinity of a particular time and (ii) media content selected on a particular day.

4. The method of claim 1, wherein identifying the first seating position within which the remote control device is positioned comprises:
    receiving a signal from the remote control device that is captured in the first image;
    identifying a location of one or more pixels that are activated in the first image due to the signal from the remote control device; and
    determining which seating position of the plurality of seating positions in the viewing area corresponds to the identified location.

5. The method of claim 1, the method further comprising:
    receiving two signals simultaneously from the remote control device;
    identifying a first location of one or more pixels and a second location of one or more pixels that are activated in the first image due to the two signals from the remote control device;
    retrieving a distance associated with the two signals;
    calculating a distance of the remote control device from a display device in the viewing area based on the identified first and second locations and the retrieved distance; and
    identifying the first seating position within which the remote control device is positioned based on the identified first and second locations and the distance.

6. The method of claim 5, wherein the two signals are received simultaneously from two infrared (IR) devices included in the remote control device.

7. The method of claim 1, the method further comprising:
    in response to identifying the first seating position within which the remote control device is positioned, identifying a second seating position of the plurality of seating positions in which a user is positioned; and
    retrieving, from a storage device, a second profile of the second seating position,
    wherein determining the media content recommendation comprises determining the media content recommendation based on the first profile and the second profile.

8. The method of claim 7, wherein identifying the second seating position in which the user is positioned comprises:
    receiving a second image of the viewing area;
    analyzing the received second image to detect silhouettes corresponding to one or more users;
    retrieving, from the storage device, a silhouette for the user;
    comparing the retrieved silhouette for the user to the silhouettes detected in the second image; and
    identifying the second seating position based on the comparison.

9. A system for recommending content, the system comprising:
    control circuitry configured to:
    receive, at a user equipment device, input from a remote control device positioned in a viewing area;
    in response to receiving the input, receive, from an image capturing device, a first image of the viewing area;
    retrieve data mapping respective profiles to each respective seating position of a plurality of seating positions in the viewing area;
    identify, based on the first image of the viewing area, a first seating position of the plurality of seating positions within which the remote control device is positioned;
    identify, based on the identified first seating position and the data mapping respective profiles to each respective seating position, a first profile corresponding to the identified first seating position;
    retrieve the first profile;
    determine, based on the first profile, a media content recommendation; and
    generate for display the media content recommendation.

10. The system of claim 9, where the control circuitry is further configured to access, from a storage device, the first profile, wherein the first profile includes a viewing history of media content selected when the remote control device was positioned within the first seating position in the viewing area.

11. The system of claim 10, wherein the viewing history includes at least one of (i) media content selected in a vicinity of a particular time and (ii) media content selected on a particular day.

12. The system of claim 9, wherein the control circuitry is configured to identify the first seating position within which the remote control device is positioned by:
receiving a signal from the remote control device that is captured in the first image;
identifying a location of one or more pixels that are activated in the first image due to the signal from the remote control device; and
determining which seating position of the plurality of seating positions in the viewing area corresponds to the identified location.

13. The system of claim 9, wherein the control circuitry is further configured to:
receive two signals simultaneously from the remote control device;
identify a first location of one or more pixels and a second location of one or more pixels that are activated in the first image due to the two signals from the remote control device;
retrieve a distance associated with the two signals;
calculate a distance of the remote control device from a display device in the viewing area based on the identified first and second locations and the retrieved distance; and
identify the first seating position within which the remote control device is positioned based on the identified first and second locations and the distance.

14. The system of claim 13, wherein the two signals are received simultaneously from two infrared (IR) devices included in the remote control device.

15. The system of claim 9, wherein the control circuitry is further configured to:
in response to identifying the first seating position within which the remote control device is positioned, identify a second seating position of the plurality of seating positions in which a user is positioned; and
retrieve, from a storage device, a second profile of the second seating position,
wherein the control circuitry is configured to determine the media content recommendation by determining the media content recommendation based on the first profile and the second profile.

16. The system of claim 15, wherein the control circuitry is configured to identify the second seating position in which the user is positioned by:
receiving a second image of the viewing area;
analyzing the received second image to detect silhouettes corresponding to one or more users;
retrieving, from the storage device, a silhouette for the user;
comparing the retrieved silhouette for the user to the silhouettes detected in the second image; and
identifying the second seating position in the viewing area based on the comparison.

* * * * *